3,207,603
DIAZOTYPE AND BLUEPRINT PHOTOPRINTING MATERIALS HAVING A COATING OF WATER-INSOLUBLE METALLIC FATTY ACID SOAP THEREON
Joseph Savit, Maywood, Ill., assignor to Eugene Dietzgen Co., Chicago, Ill., a corporation of Delaware
No Drawing. Filed June 9, 1960, Ser. No. 34,883
5 Claims. (Cl. 96—75)

This invention relates to unique diazotype photoprinting materials and to a process for improving the contrast, image density, smoothness, and other properties of diazo prints. The invention also relates to improved blueprint photoprinting paper and processes.

In diazotype reproduction processes a light-sensitive diazo compound is coated on a suitable base such as paper, cloth, or plastic film. The coated base is "exposed" to ultraviolet light under a translucent master such as an engineering drawing, photographic positive, typed material or other design. In the exposed area, the diazo is decomposed. In the area protected from light the diazo remains and will react with an azo coupling component under suitable conditions to form an intensely colored azo dye image which precisely duplicates the original pattern.

Diazotype reproduction processes commonly are referred to as either a "moist process" or a "dry process." In the moist or one-component system a suitable support is coated with a sensitizing solution containing a diazo. After exposure to ultraviolet light, development is accomplished by applying an azo coupling component to the surface of the coated support, in an environment suitable to produce coupling. In the dry process (a two-component system) both the diazo compound and the coupling component are contained in sensitizing solutions applied to the base. The two components are stabilized to prevent premature coupling. After the surface has been exposed to light in the usual manner, formation of an azo dye is accomplished by exposure to alkaline vapors such as ammonia or volatile organic amines or to liquids such as aqueous alkaline solutions. In a modified process of the same type, the diazo compound, coupler, and an ammonia generating compound, such as urea, are coated on the base along with suitable stabilizers. Following the exposure of the paper, cloth, etc., heat is applied to decompose the urea to form ammonia gas which initiates the coupling reaction.

Sensitizing solutions used in the two-component process usually contain other compounds to improve general quality. Examples are organic acids to prevent premature coupling, metal salts to improve shelf-life and color brightness, humectants to increase rate of dye development, and antioxidants such as thiourea to reduce background discoloration.

The surface texture of the paper, cloth, or other base, influences, to a large extent, the quality of the diazotype print. An uneven surface markedly reduces the contrast between dyeline and background. For this reason efforts have been made to reduce surface irregulaities of the base support, not only in the manufacture of the support but also through the addition of various coating materials to the base. Coating compounds usually are applied either as a precoat or are incorporated in the sensitizing solution itself. Smoothness of background is also very important in blueprints inasmuch as unevenness of surface is emphasized by the dark blue color of the background.

Colloidal and noncolloidal silica have been used as coating agents but these materials are deficient in many respects. It has been found, for example, that both colloidal and noncolloidal silica often act as chromotographic separators. Additionally, such additives are not overly effective in reducing background mottle and increasing dyeline-background contrast.

The addition of inert fillers to a base stock surface is helpful in reducing surface irregularities. Such fillers, however, either reduce dye density or cause background discoloration. This is especially true of certain clays. Various starches also have been applied to coatings to improve print quality. Such materials, however, are difficult to handle because of the relative ease with which they undergo gelation and they are deficient in other respects.

It is an object of the present invention to provide diazotype and blueprint materials which will produce smooth prints having excellent image density and contrast.

Another object of the invention is to provide a process for reducing background pattern resulting from variations in diazo discomposition due to uneven surfaces.

Still another object of the invention is to provide a process for improving the smoothness of base materials which can be carried out without difficulty.

Other objects will become apparent to those skilled in the art from the following detailed description of the invention.

In general, the present invention comprises the discovery that particular metallic soaps provide unusually effective coating materials for use in a diazotype and blueprint photoprinting processes. More particularly, it has been found that prints which are formed using base materials which have been coated with a metallic soap are exceptionally smooth, have good contrast, and are highly satisfactory from the standpoint of color density and background pattern.

The term "metallic soaps" as it is used in the subject disclosure is intended to cover compounds of fatty acids and metals other than alkali metals such as sodium and potassium. It is important that the soaps be insoluble. Sodium and potassium soaps, in contrast, are readily soluble in water. Coating agents which satisfy the requirements of the process include lithium soaps, magnesium soaps, strontium soaps, calcium soaps, aluminum soaps, and zinc soaps, and to a lesser extent iron soaps, lead soaps, cobalt soaps, barium soaps, cadmium soaps, copper soaps, and manganese soaps. It has been found that soaps of saturated monocarboxy fatty acids having less than about 12 carbon atoms often act as penetrating agents. For this reason, they are fully satisfactory for the subject purposes. Insoluble salts of saturated or unsaturated monocarboxy fatty acids having from 12 to about 33 carbon atoms, and preferably from about 14 to 18 carbon atoms, can be used satisfactorily in the process. It has been found that salts of dicarboxylic acids containing from 6 to 12 carbon atoms and preferably from 8 to 10 carbon atoms provide suitable coating agents. Such acids include pimelic acid, suberic acid, azelaic acid, and sebacic acid. In general, it can be said that any insoluble metal salt can be used satisfactorily in the process so long as it does not cause penetration. The following table contains a partial list of satisfactory additives.

TABLE I

| Metal | Fatty Acid Component | Unit Chain Length C atoms | Type |
|---|---|---|---|
| Ferric | Stearate | 18 | Saturated. |
| Lithium | Hydroxy stearate | 18 | Do. |
| Do | Stearate | 18 | Do. |
| Magnesium | do | 18 | Do. |
| Do | Tall oil fatty acids | 16–20 | Mixed. |
| Calcium | Stearate | 18 | Saturated. |
| Do | Tall oil fatty acids | 16–20 | Mixed. |
| Aluminum | Stearate | 18 | Saturated. |
| Do | Hydroxy stearate | 18 | Do. |
| Do | Palmitate | 16 | Do. |
| Do | Hydroxy palmitate | 16 | Do. |
| Do | Oleate | 18 | Unsaturated. |
| Zinc | Myristate | 14 | Saturated. |
| Do | Palmitate | 16 | Do. |
| Do | Stearate | 18 | Do. |
| Do | Sebacitate | 10 | Dicarboxylic. |
| Do | Tall oil fatty acids | 16–20 | Mixed. |
| Lead | do | 16–20 | Do. |
| Cobalt | do | 16–20 | Do. |
| Manganese | do | 16–20 | Do. |

There are at least two methods that are commonly used to manufacture metallic soaps. In the first method, a fatty acid is heated in the presence of a metallic oxide, hydroxide, or carbonate to form a soap. In the second method, soaps are prepared by a double decomposition or precipitation process. Alkali soap solutions are precipitated with solutions of alkaline earth or heavy metal salts. A typical reaction is as follows:

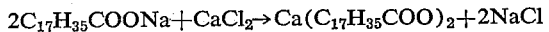

$$2C_{17}H_{35}COONa + CaCl_2 \rightarrow Ca(C_{17}H_{35}COO)_2 + 2NaCl$$

The precipitated soap is filtered, washed free of impurities, and dried.

The particle size of the soaps can vary over a wide range. If a substantial proportion of the particles have a diameter of over 50 microns, however, the coating is not sufficiently smooth. On the other hand, it has been found that if a substantial proportion of the particles have a diameter of less than 1 micron, dispersion problems may arise. It is, therefore, preferred that at least 80% of the soap particles have a diameter of between about 1 to 50 microns. The most advantageous results are obtained where more than 50% of the particles have a diameter of between about 1 micron and about 10 microns.

The metallic soaps can be incorporated either in a precoat solution or in the sensitizing solution. The solution containing the metal soap can be applied to a moving web, in the case of paper or sheet material, by means of an applicator roller or slotted tube. The excess is doctored off by an "air knife" or a glass bar, and the web is dried in a chamber supplied with heated air. Other conventional methods of application might also be used, such as brush coating or spraying.

The amount of soap applied to the surface of the base will vary somewhat according to the nature of the paper, cloth, plastic film, etc. In general, it has been found that the use of from about 0.01 g. to about 3 g. of the metallic soap per square meter of the base is satisfactory in most instances. My preferred range is from about 0.02 g. to about 0.5 g. of soap per square meter of the support. The percentage of metal soap in the coating solution will vary widely. The overall range of soap in the solution would be from about 0.1% to about 20%, and preferably from about 0.25% to about 2.5%.

The use of a binder along with the soap is helpful in many instances in that the binder acts as a suspending agent and often provides an even smoother base surface. Satisfactory binders include polyvinyl acetate emulsions, methyl cellulose, hydroxyethyl cellulose, polyvinyl alcohols, gum arabic and other gums, alginates, acrylic emulsions, gelatin, glues, caseinates, water-soluble styrene polymers, and cooked starches. If a binder is used, approximately 0.05 to 15 parts of binder are added to one part of metallic soap. The amount of binder employed varies widely according to the nature of the material.

The following examples are illustrative of the present invention.

*Example 1*

Ten (10) g. of zinc palmitate was suspended in 1 liter of water. This solution was then applied to direct process paper and allowed to dry. Subsequently, the following sensitizer was coated over the precoat:

| | | |
|---|---|---|
| Deionized water | liter | 1 |
| Diethylene glycol | cc | 50 |
| Citric acid | g | 20 |
| Thiourea | g | 5 |
| Zinc chloride | g | 75 |
| 2,3-dihydroxy naphthalene-6-sodium sulfonate | g | 40 |
| N,N-diethylaniline-p-diazonium chloride-zinc chloride double salt | g | 15 |
| Saponin | g | 0.5 |

When the above paper was exposed and developed with ammonia vapors, it had a smoother feel, a brighter blue color, and better coverage than paper treated in an identical manner but without the precoat.

*Example 2*

In this example, the following precoat solution was applied to and dried on transparentized 100% rag intermediate paper.

| | | |
|---|---|---|
| Water | liter | 1 |
| 11% of colloidal silica (.015–.020 micron) suspension | cc | 400 |
| Polyvinyl acetate emulsion (50% solids) | cc | 50 |
| Aluminum oleate | g | 10 |

The following sensitizer was then applied to the treated paper:

| | | |
|---|---|---|
| Water (45–50° C.) | liter | 1 |
| Ethylene glycol | cc | 80 |
| Citric acid | g | 65 |
| Boric acid | g | 37 |
| Zinc chloride | g | 80 |
| Thiourea | g | 60 |
| Resorcinol | g | 20 |
| N-methyl, N-hydroxyethylaniline-p-diazonium chloride-zinc chloride double salt | g | 70 |

The sepia intermediate when developed with ammonia vapor gave a product which was superior in coverage, reprint opacity, smoothness and visual density than a similar paper containing no aluminum oleate.

*Example 3*

This example illustrates a process wherein the metal soap is suspended directly in the sensitizer solution. The following sensitizer was applied to direct process paper:

| | | |
|---|---|---|
| Water (45–50° C.) | liter | 1 |
| Diethylene glycol | cc | 50 |
| Citric acid | g | 20 |
| Thiourea | g | 5 |
| Zinc chloride | g | 75 |
| 2,3-dihydroxy naphthalene-6-sodium sulfonate | g | 40 |
| N,N-diethylaniline-p-diazonium chloride-zinc chloride double salt | g | 15 |
| Saponin | g | 0.5 |
| Calcium stearate | g | 10 |

This coating when developed with ammonia vapor gave a brighter blue color, more density and smoother and better coverage than a similar coating without calcium stearate.

Example 4

In this example, the sensitizer solution was prepared containing the following materials:

| | | |
|---|---|---|
| Water (45–50° C.) | liter | 1 |
| Diethylene glycol | cc | 50 |
| Citric acid | g | 20 |
| Thiourea | g | 5 |
| Zinc chloride | g | 75 |
| 2,3-dihydroxy naphthalene-6-sodium sulfonate | g | 40 |
| N,N-diethylaniline-p-diazonium chloride-zinc chloride double salt | g | 15 |
| Saponin | g | 0.5 |
| Polyvinylacetate emulsion (50% solids) | cc | 50 |
| Zinc sebacitate | g | 10 |

When direct process paper coated with the above sensitizer was developed with ammonia vapor, a dense and bright blue color was obtained with excellent smoothness and contrast. The diazo print was significantly superior in quality to a similar print prepared without the use of zinc sebacitate.

Example 5

In this example, the sensitizer solution was prepared containing the following materials:

| | | |
|---|---|---|
| Water (45–50° C.) | liter | 1 |
| Polyglycol 400 | cc | 25 |
| Diethylene glycol | cc | 50 |
| Citric acid | g | 50 |
| Zinc chloride | g | 100 |
| Thiourea | g | 60 |
| Resorcinol | g | 2.5 |
| Acetoacetanilide | g | 1.0 |
| Phloroglucinol | g | 0.5 |
| 2,3-dihydroxynaphthalene-6-sodium sulfonate | g | 10 |
| N,N-diethylaniline-p-diazonium chloride-zinc chloride double salt | g | 14 |
| 11% of colloidal silica (.015–.020 micron) suspension | cc | 190 |
| Zinc stearate | g | 10 |

When direct process paper coated with the above sensitizer was developed with ammonia vapor, a dense and bright black color was obtained with excellent smoothness and contrast. The diazo print was significantly superior in quality to a similar print prepared without the use of zinc stearate.

Example 6

In this example, a direct process paper was precoated with the following composition:

| | Liter |
|---|---|
| Water | 1 |
| Polyvinylacetate (50% solids) | 1 |

To this plastic precoat was applied a sensitizer containing the following materials:

| | | |
|---|---|---|
| Water (45–50° C.) | liter | 1 |
| Diethylene glycol | cc | 50 |
| Citric acid | g | 22.5 |
| Zinc chloride | g | 100 |
| Thiourea | g | 25 |
| 2,3-dihydroxynaphthalene-6-sodium sulfonate | g | 42.5 |
| N,N-diethylaniline-p-diazonium chloride-zinc chloride double salt | g | 21.8 |
| 11% colloidal silica (.015–.020 micron) suspension | cc | 190 |
| Polyvinylacetate emulsion (50% solids) | cc | 50 |
| Lithium hydroxy stearate | g | 10 |

When the plastic coated paper was exposed and developed with ammonia vapors, the surface of the print was smoother and had significantly less tack than a similar print prepared without the use of lithium hydroxy stearate.

Example 7

The following sensitizer formula was applied to a transparentized intermediate stock:

| | | |
|---|---|---|
| Water (55–60° C.) | liter | 1 |
| Citric acid | g | 2 |
| Ammonium sulphate | g | 20 |
| 1,3,6-naphthalene-trisulfonic acid | g | 100 |
| Zinc chloride double salt of 3-chloro-4-diethylaminobenzene diazonium chloride | g | 57.5 |
| Saponin | g | 2 |
| 11% colloidal silica (.015–0.20 micron) suspension | cc | 240 |
| Polyvinylacetate emulsion (50% solids) | cc | 50 |
| Magnesium stearate | g | 10 |

The coated paper was exposed and then was developed by an alkaline developer containing:

| | | |
|---|---|---|
| Water | liter | 1 |
| Potassium tetraborate | g | 70 |
| Aerosol AY solution (0.8 gm./1 cc. methanol) | cc | 2.4 |
| Urea | g | 10 |
| Sequestrene | g | 1 |
| Phloroglucinol | g | 5 |
| Resorcinol | g | 4 |
| Potassium chloride | g | 10 |
| Hydroquinone | g | 1 |

The coating gave a brown colored image on a very transparent background. The visual density, reprint opacity, and coverage were greater than a similar coating without magnesium stearate.

Example 8

This example, like Example 7, illustrates the use of the subject invention in a so-called moist diazotype process. The following sensitizer was coated on direct process paper:

| | | |
|---|---|---|
| Water (45–50° C.) | liter | 1 |
| Ammonium oxalate | g | 10 |
| Aluminum sulphate | g | 10 |
| Ammonium citrate | g | 10 |
| Thiourea | g | 10 |
| N-benzyl-methyl-p-diazonium chloride-zinc chloride double salt | g | 20 |
| 11% colloidal silica (.015–.020 micron) suspension | cc | 190 |
| Polyvinylacetate emulsion (50% solids) | cc | 50 |
| Zinc stearate | g | 10 |

When the paper was exposed and developed with the alkaline developer set forth in Example 7, a print was produced having a whiter background, denser black image color, and greater smoothness than a similar coating prepared without the use of zinc stearate. The prints were also more resistant to ink feathering than those made without zinc stearate.

Example 9

A precoat containing the following ingredients was applied to direct process paper and dried:

| | | |
|---|---|---|
| Water | liters | 1,000 |
| Zinc stearate | g | 150 |
| Polyvinylacetate (50% solids) | cc | 100 |

Thereafter, the sensitizer set forth in Example 4 was applied to the precoat. After developing the paper with ammonia vapors, a print was obtained having a denser and brighter color and smoother surface than a similar print produced without the use of zinc stearate in the precoat.

Example 10

A blueprint sensitizer having the following formulation was applied to 50% rag blueprint base stock:

| | |
|---|---|
| Water _____liter__ | 1 |
| Sodium potassium polyphosphate _____g__ | 8.5 |
| Citric acid _____g__ | 5.7 |
| Yellow prussiate of potash _____g__ | 17 |
| Red prussiate of potash _____g__ | 16 |
| Ammonium oxalate _____g__ | 5.7 |
| Ferrous oxalate _____g__ | 5.7 |
| Ferric ammonium oxalate _____g__ | 96 |
| 11% colloidal silica (.015–.020 micron) suspension _____g__ | 10.5 |
| Zinc stearate _____g__ | 10.5 |

When this coated stock was printed on a blueprint processing machine, a significantly improved blue color, smoothness of background, and smoothness of feel was obtained than was possible where a similar coating was applied without the use of zinc stearate.

As was indicated above, the subject invention is suitable for use in connection with virtually all known diazo compounds and azo coupling components. Examples of diazo compounds are the diazonium salts obtained by diazotization of the following amines:

p-Amino-N,N-dimethylaniline
p-Amino-N,N-diethylaniline
p-Amino-N-ethyaniline
p-Amino-N-ethyl-N-β-hydroxyethylaniline
p-Amino-N-methyl-N-β-hydroxyethylanile
p-Amino-N,N-di-β-hydroxyethylaniline
p-Amine-m-ethoxy-N,N-diethylaniline
p-Amino-N-ethyl-o-toluidine
p-Amino-N-ethyl-m-toluidine
p-Amino-N,N-diethyl-m-toluidine
p-Amino-N-ethyl-N-benzylaniline
p-Amino-N-ethyl-N-β-hydroxyethyl-m-toluidine
N-p-amino-phenylmorpholine
p-Amino-diphenylamine
3-Aminocarbazole and the like These diazonium salts are commonly employed as their stabilized double salts, e.g., their zinc chloride, cadmium chloride, or stannic chloride double salts.

Examples of suitable azo coupling agents are the following:

2,3-dihydroxynaphthalene
2,3-dihydroxynaphthalene-6-sulfonic acid
Resorcinol
Phloroglucinol
Acetoacetanilide
7-hydroxy-1,2-naphthimidazole
1-phenyl-3-methyl-5-pyrazolone
2-naphthol-3,6-disulfonic acid and the like It is also contemplated that in providing the azo dye coupling component on the sensitized surface of the base, a coupler capable of thermal transfer or vapor distillation may be provided on the unsensitized side with the alkaline material for transfer therewith to the sensitized side upon application of heat.

The diazo compounds and coupling components are applied to the base in conventional coating solutions and at standard rates of application. For example, diazo compounds are conventionally applied to diazotype paper at the rate of 10 to 50 grams per 1,000 square feet.

Suitable carriers or supports that are contemplated for use in the subject process include not only various types of paper such as wood pulp paper, rag paper or document paper, and photograhic film base such as cellulose acetate, cellulose acetate butyrate, and the like but also textiles including fabrics made from cotton, cellulose acetate, batiste, regenerated cellulose of the xanthate or viscose type, linen, rayon, mixed cotton and rayon, as well as other absorbent, fibrous, woven or felted materials. Also contemplated are various plastic films such as polyvinyl chloride, polyethylene terephthalate, and the like.

As was pointed out above, the light sensitive diazo compound, the azo coupling component, and the other adjuncts of the sensitizing solution are not critical factors in the practice of the invention. Any diazo compound and coupler which is suitable for producing satisfactory diazo prints may be used.

The subject process produces diazo type prints which are improved in many respects. In particular, the process improves the smoothness of the print; improves the density of the color of the developed image; improves the brightness of color of the developed image; improves the visual density of intermediate coatings; improves the reprint opacity of intermediate coatings; reduces the thickness of plastic coated products; increases the smoothness to feel of coated stock; reduces background pattern; improves the coverage of the coating solution on the base stock; reduces feathering to ink; and improves the line contrast.

Obviously, many modifications and variations of the invention as hereinbefore set forth may be made without departing from the spirit and scope thereof, and therefore only such limitations should be imposed as are indicated in the appended claims.

The invention is hereby claimed as follows:

1. Improved photoprinting materials which comprise: a base selected from the group consisting of paper, cloth, and plastic film; a coating on said base, said coating containing particles of a substantially water-insoluble metallic fatty acid soap in contact with said base, said fatty acid being selected from the group consisting of monocarboxylic fatty acids having from 12 to 33 carbon atoms and dicarboxylic fatty acids having from 6 to 12 carbon atoms, the metal of said soap being selected from the group consisting of iron, lithium, strontium, copper, barium, cadmium, magnesium, calcium, aluminum, zinc, lead, cobalt, and manganese; and a light-sensitive compound in contact with said metallic fatty acid soap, said light-sensitive compound being selected from the group consisting of diazonium salt and a blueprint ferric ammonium compound.

2. Improved photoprinting materials which comprise: a base selected from the group consisting of paper, cloth, and plastic film; a coating on said base, said coating consisting of a sublayer of substantially water-insoluble particles of a metallic fatty acid soap, said fatty acid being selected from the group consisting of monocarboxylic fatty acids having from 12 to 33 carbon atoms and dicarboxylic fatty acids having from 6 to 12 carbon atoms, the metal of said soap being selected from the group consisting of iron, lithium, strontium, copper, barium, cadmium, magnesium, calcium, aluminum, zinc, lead, cobalt, and manganese; said coating including a second layer containing a light-sensitive compound, said light-sensitive compound being selected from the group consisting of a diazonium salt and a blueprint ferric ammonium compound.

3. Improved photoprinting materials which comprise: a base selected from the group consisting of paper, cloth, and plastic film; a coating on said base, said coating containing an intimate mixture of (1) particles of a substantially water-insoluble metallic fatty acid soap, said fatty acid being selected from the group consisting of iron, lithium, strontium, copper, barium, cadmium, magnesium, calcium, aluminum, zinc, lead, cobalt, and manganese, and (2) a light-sensitive compound, said light-sensitive compound being selected from the group consisting of a diazonium salt and a blueprint ferric ammonium compound.

4. Improved photoprinting materials which comprise: a base selected from the group consisting of paper, cloth, and plastic film; a coating on said base, said coating including a sublayer of water-insoluble particles of a metallic soap of a monocarboxylic fatty acid having from 14 to 18 carbon atoms, the metal of said soap being selected from the group consisting of iron, lithium, strontium, copper, barium, cadmium, magnesium, calcium, aluminum, zinc, lead, cobalt, and manganese; and a second layer containing a light-sensitive compound, said light-sensitive compound being selected from the group consisting of diazonium salt and a blueprint ferric ammonium compound.

5. Improved photoprinting materials as in claim 1 wherein the amount of metallic soap applied to said base is from about 0.01 gram to about 3.0 grams per square meter of said base, and wherein at least 80% of said soap particles have a diameter of between about 5 and 50 microns.

References Cited by the Examiner

UNITED STATES PATENTS

| | | | |
|---|---|---|---|
| 654,688 | 7/00 | Thornton et al. | 117—154 |
| 1,430,998 | 10/22 | Hoskins | 117—154 X |
| Re. 20,708 | 4/38 | Hinman | 96—92 XR |
| 2,313,808 | 3/43 | Dalton | 117—154 |
| 2,517,111 | 8/50 | Jahoda | 96—92 |
| 2,527,261 | 10/50 | Hart et al. | 96—85 XR |
| 2,583,607 | 1/52 | Sirianni et al. | 117—167 X |
| 2,692,827 | 10/54 | Brinnick et al. | 96—33 |
| 2,805,161 | 9/57 | Wood | 96—33 |
| 2,838,994 | 6/58 | Lebl | 96—91 XR |

FOREIGN PATENTS

| | | |
|---|---|---|
| 101,831 | 8/37 | Australia. |
| 21,884 of 1914 | 1/16 | Great Britain. |

NORMAN G. TORCHIN, *Primary Examiner.*

RICHARD D. NEVIUS, HAROLD N. BERNSTEIN, *Examiners.*